United States Patent
Wang

(10) Patent No.: US 12,084,128 B2
(45) Date of Patent: Sep. 10, 2024

(54) BRAKE HANDLE DEVICE AND ELECTRIC TRACTOR

(71) Applicant: INTRADIN (SHANGHAI) MACHINERY CO., LTD., Shanghai (CN)

(72) Inventor: Junliang Wang, Shanghai (CN)

(73) Assignee: INTRADIN (SHANGHAI) MACHINERY CO., LTD., Shanghai (CN)

( * ) Notice: Subject to any disclaimer, the term of this patent is extended or adjusted under 35 U.S.C. 154(b) by 519 days.

(21) Appl. No.: 16/924,182

(22) Filed: Jul. 9, 2020

(65) Prior Publication Data

US 2021/0155299 A1 May 27, 2021

(30) Foreign Application Priority Data

Nov. 26, 2019 (CN) .......................... 201922070906.1

(51) Int. Cl.
*B62D 51/00* (2006.01)
*B60L 3/02* (2006.01)
*B60L 50/60* (2019.01)
*B62D 51/04* (2006.01)

(52) U.S. Cl.
CPC .............. *B62D 51/002* (2013.01); *B60L 3/02* (2013.01); *B60L 50/60* (2019.02); *B62D 51/04* (2013.01)

(58) Field of Classification Search
CPC ...... B62D 51/002; B62D 51/04; B60K 28/02; B60K 28/04; B60L 3/02; B60T 7/102
See application file for complete search history.

(56) References Cited

U.S. PATENT DOCUMENTS

| | | | | |
|---|---|---|---|---|
| 3,982,082 A | * | 9/1976 | Thorud | A01D 34/475 200/43.16 |
| 4,044,532 A | * | 8/1977 | Lessig, III | H01H 3/20 56/10.5 |
| 4,167,221 A | * | 9/1979 | Edmonson | B62D 51/001 180/19.3 |
| 4,186,287 A | * | 1/1980 | Scott | A47L 15/0049 200/332 |
| 4,746,141 A | * | 5/1988 | Willis | E04F 21/0023 280/655 |
| 5,465,807 A | * | 11/1995 | Josephs | B60R 3/02 180/277 |

(Continued)

FOREIGN PATENT DOCUMENTS

| | | | | |
|---|---|---|---|---|
| CN | 203902710 U | 10/2014 | | |
| CN | 105539252 A | 5/2016 | | |
| EP | 0665156 A2 | * 8/1995 | ............... | B62B 3/06 |

*Primary Examiner* — Frank B Vanaman

(57) ABSTRACT

A brake handle device includes a seat body, a microswitch, a wrench and an elastic piece, wherein the microswitch is electrically connected with a driving motor and a power supply, and includes a main body part and a braking part; the main body part is arranged on the seat body; the braking part extends into the main body part and can elastically expand and contract relative to the main body part; the wrench is rotatably arranged on the seat body and can be abutted against the braking part; and the elastic piece is arranged on the seat body and connected with the wrench. The wrench is held to drive the wrench to rotate in the direction close to a handlebar; and the wrench is released to make the wrench rotate and reset.

11 Claims, 5 Drawing Sheets

(56) References Cited

U.S. PATENT DOCUMENTS

| | | | | |
|---|---|---|---|---|
| 5,899,284 A | * | 5/1999 | Reimers | B62B 5/0026 |
| | | | | 280/DIG. 6 |
| 6,078,015 A | * | 6/2000 | Martinez | A01D 34/6818 |
| | | | | 200/332.2 |
| 6,871,714 B2 | * | 3/2005 | Johnson | B60D 1/02 |
| | | | | 180/19.2 |
| 2004/0134692 A1 | * | 7/2004 | Kime | B62D 51/04 |
| | | | | 180/19.1 |
| 2016/0159334 A1 | * | 6/2016 | Lichtenberg | G05G 1/04 |
| | | | | 251/89 |

\* cited by examiner

BRAKE HANDLE DEVICE AND ELECTRIC TRACTOR

CROSS-REFERENCE TO RELATED APPLICATIONS

This application claims the benefit of priority from Chinese Patent Application No. CN201922070906.1, filed on Nov. 26, 2019. The content of the aforementioned application, including any intervening amendments thereto, is incorporated herein by reference in its entirety.

TECHNICAL FIELD

The present invention relates to the technical field of outdoor transportation, in particular to a brake handle device and an electric tractor.

BACKGROUND OF THE PRESENT INVENTION

An electric tractor provides a driving force for a wheel assembly through a driving motor; and a microswitch is used as a switch for controlling the on-off between a power supply and the driving motor. The existing electric tractor usually requires a user to directly touch the microswitch by hand for related operations, which easily causes electric shock to the user, thereby bringing great potential safety hazards to the user during use of the electric tractor.

SUMMARY OF THE PRESENT INVENTION

In view of this, it is necessary to provide a brake handle device and an electric tractor with convenient operation and high safety.

The brake handle device is mounted on an electric tractor body, wherein the electric tractor body includes a driving motor, a wheel assembly, a power supply and a frame; the wheel assembly is connected with the driving motor; the driving motor is used for driving the wheel assembly to rotate; the power supply is electrically connected with the driving motor, and is used for supplying power to the driving motor; the frame is connected to the wheel assembly; and the frame is provided with a handlebar. The brake handle device includes:
  a seat body, which is arranged at the position of the handlebar of the frame;
  a microswitch, which is electrically connected with the driving motor and the power supply and includes a main body part and a braking part, wherein the main body part is arranged on the seat body; the braking part extends into the main body part and can elastically expand and contract relative to the main body part;
  a wrench, which is rotatably arranged on the seat body and can be abutted against the braking part; and
  an elastic piece, which is arranged on the seat body, is connected with the wrench, and is used for providing an elastic force for the wrench to drive the wrench to rotate and reset in the direction far from the handlebar. The wrench is held to drive the wrench to rotate in the direction close to the handlebar, so that the wrench presses the braking part into the main body part for a preset length, thereby controlling the microswitch to conduct the electric connection between the power supply and the driving motor; and the wrench is released to make the wrench rotate and reset in the direction far from the handlebar under the driving of the elastic force of the elastic piece and to separate the wrench from the braking part, so that the braking part is elastically reset relative to the main body part, thereby further controlling the microswitch to disconnect the electric connection between the power supply and the driving motor.

In one of the embodiments, the brake handle device further includes a rotating shaft; and the wrench is rotatably connected with the seat body by the rotating shaft.

In one of the embodiments, the wrench includes:
  a cam, which is rotatably arranged on the seat body, is connected with the elastic piece, and is used for abutting against the braking part; and
  a holding part, which is connected with the cam and is used for a user to apply a holding force to the wrench.

In one of the embodiments, the wrench further includes a lug which is connected with the cam, wherein one end of the elastic piece is sleeved on the lug.

In one of the embodiments, the brake handle device further includes an outer cover, which is arranged on the seat body and surrounds the seat body to form a closed mounting space, wherein the microswitch and the elastic piece are accommodated in the mounting space; and the wrench is partially accommodated in the mounting space.

The electric tractor includes:
  an electric tractor body, wherein the electric tractor body includes a driving motor, a wheel assembly, a power supply and a frame; the wheel assembly is connected with the driving motor; the driving motor is used for driving the wheel assembly to rotate; the power supply is electrically connected with the driving motor, and is used for supplying power to the driving motor; the frame is connected to the wheel assembly; and the frame is provided with a handlebar; and the above brake handle device.

In one of the embodiments, the electric tractor further includes a protective piece which is arranged outside a handlebar.

In one of the embodiments, the frame further includes a support rod assembly connected with the handlebar, wherein the support rod assembly can be opened or folded so that the length of the support rod assembly can be adjusted.

In one of the embodiments, the support rod assembly includes a plurality of support rods connected in sequence, wherein each support rod is sequentially arranged along an axial direction of the support rods when the support rod assembly is in an opened state; and at least two adjacent support rods are arranged side by side along the axial direction perpendicular to the support rods when the support rod assembly is in a folded state.

In one of the embodiments, the support rod can rotate relative to another support rod adjacent to the support rod to open or fold the support rod assembly.

The brake handle device provided by the present invention is mounted on the electric tractor body; and when the electric tractor body is required to work, the wrench is held to drive the wrench to rotate in the direction close to the handlebar, so that the wrench presses the braking part into the main body part for a preset length, and then the microswitch is controlled to conduct the electric connection between the power supply and the driving motor, thereby implementing that the power supply supplies power to the driving motor. When the electric tractor body is required to stop working, only the wrench needs to be released to make the wrench rotate and reset in the direction far from the handlebar under the driving of the elastic force of the elastic piece and to separate the wrench from the braking part, so that the braking part is elastically reset relative to the main body part, and then the microswitch is controlled to disconnect the electric connection between the power supply and the driving motor, thereby implementing that the power supply stops supplying power to the driving motor. Therefore, the user can control the microswitch to conduct or disconnect the electric connection between the power supply and the driving motor without directly touching the microswitch by holding or releasing the wrench of the brake handle device provided by the present invention, thereby greatly improving the use safety of the electric tractor body and having the advantages of convenient operation and high safety.

BRIEF DESCRIPTION OF THE DRAWINGS

To more clearly describe the technical solution in the embodiments of the present invention or in the prior art, the drawings required to be used in the description of the embodiments or the prior art will be simply presented below. Apparently, the drawings in the following description are merely some embodiments of the present invention, and for those ordinary skilled in the art, other drawings can also be obtained according to the provided drawings without contributing creative labor.

DETAILED DESCRIPTION OF THE PRESENT INVENTION

The technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

It should be noted that all directional indications (such as upper, lower, left, right, front and rear) in embodiments of the present invention are only used for illustrating the relative position relationship, movement situation and the like among various components in a certain specific posture (as shown in the accompany drawings). If the specific posture changes, the directional indications will change accordingly.

In addition, the descriptions related to "first", "second" and the like in the present invention are merely descriptive, and cannot be understood as an indication or implication of relative importance or an implicit indication for the number of indicated technical features. Therefore, the features defined with "first" and "second" can include at least one of the features explicitly or implicitly. In addition, "and/or" in the present invention includes three solutions. A and/or B is taken as an example, including a technical solution A, a technical solution B, and technical solutions that A and B are satisfied at the same time. In addition, the technical solutions of the various embodiments can be combined with one another, but only on the basis that it can be implemented by those ordinary skilled in the art. When a combination of the technical solutions is contradictory or impossible to implement, it should be considered that the combination of the technical solutions does not exist, and is not within the protection scope required by the present invention.

Figure 1:
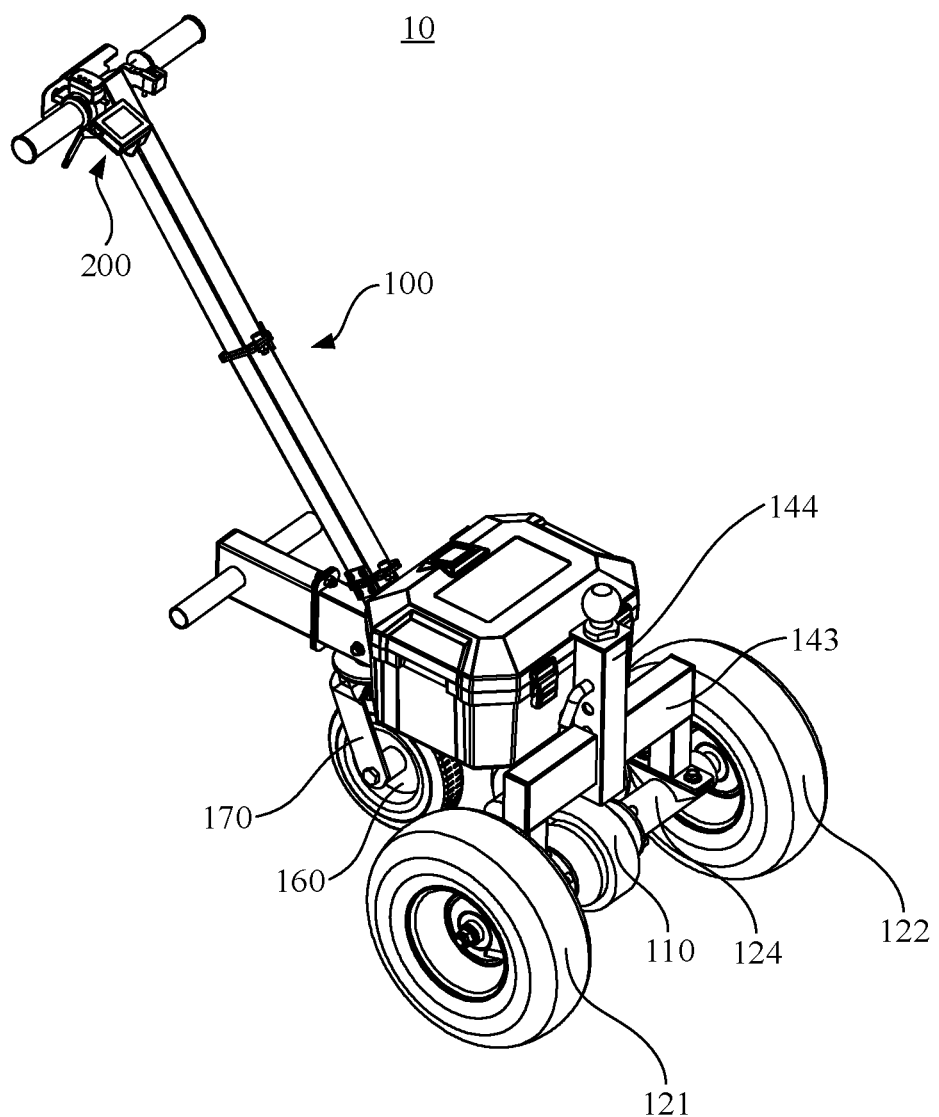
FIG. 1 is a structural schematic diagram of an electric tractor in an embodiment.
Figure 2:
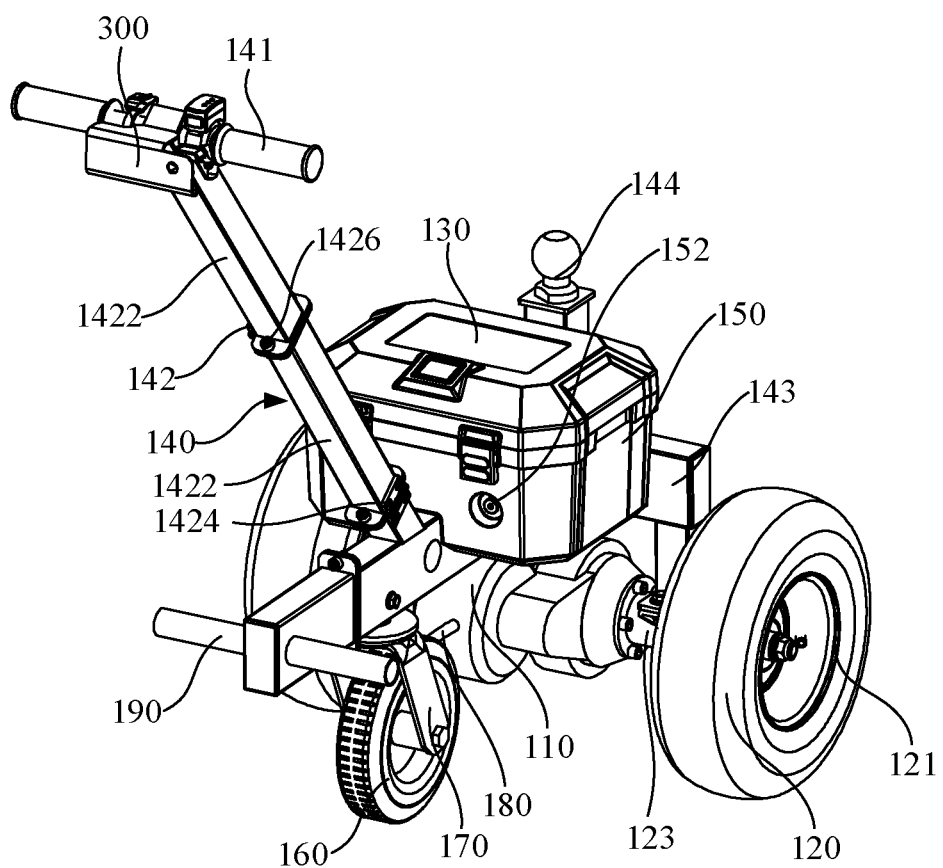
FIG. 2 is a structural schematic diagram of an electric tractor shown in FIG. 1 in another perspective.

As shown in FIG. 1 and FIG. 2, an electric tractor 10 in one embodiment includes an electric tractor body 100 and a brake handle device 200; the electric tractor body 100 includes a driving motor 110, a wheel assembly 120, a power supply 130 and a frame 140; the wheel assembly 120 is connected with the driving motor 110; the driving motor 110 is used for driving the wheel assembly 120 to rotate; the power supply 130 is electrically connected with the driving motor 110, and is used for supplying power to the driving motor 110; the frame 140 is connected to the wheel assembly 120; and the frame 140 is provided with a handlebar 141.

Figure 3:
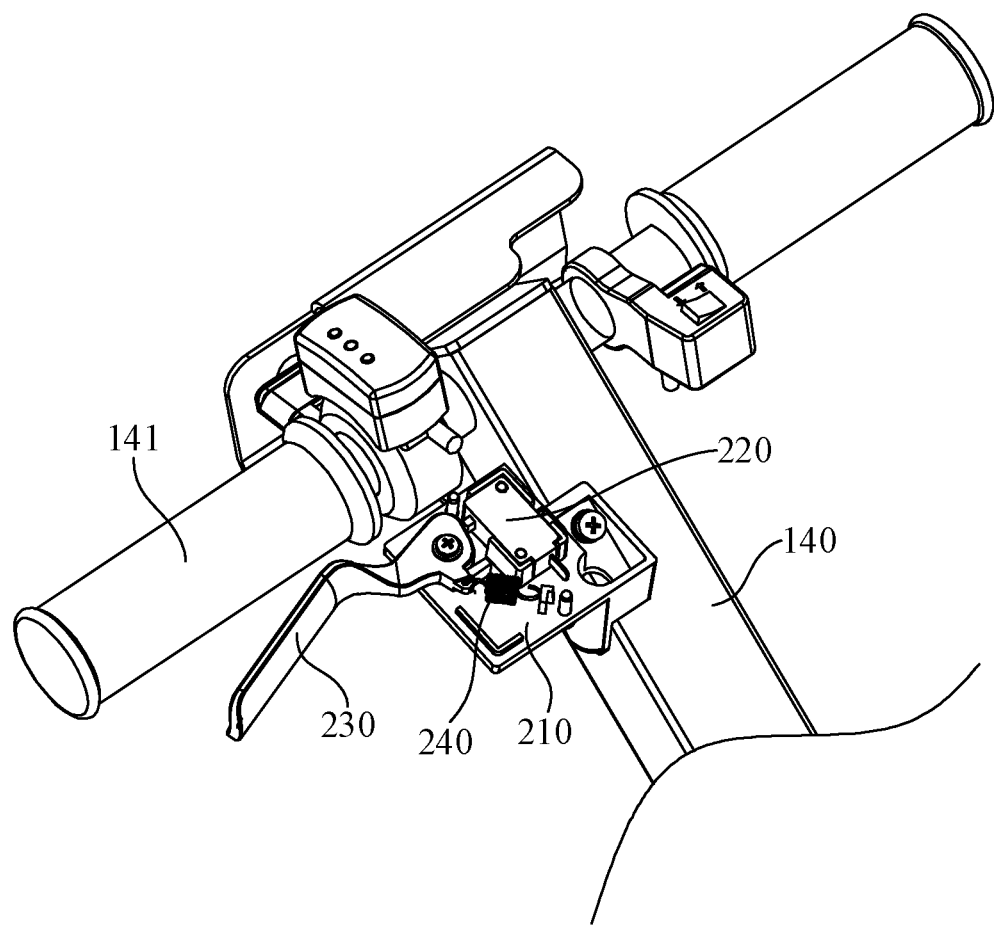
FIG. 3 is a structural schematic diagram of a part of an electric tractor shown in FIG. 1.
Figure 4:
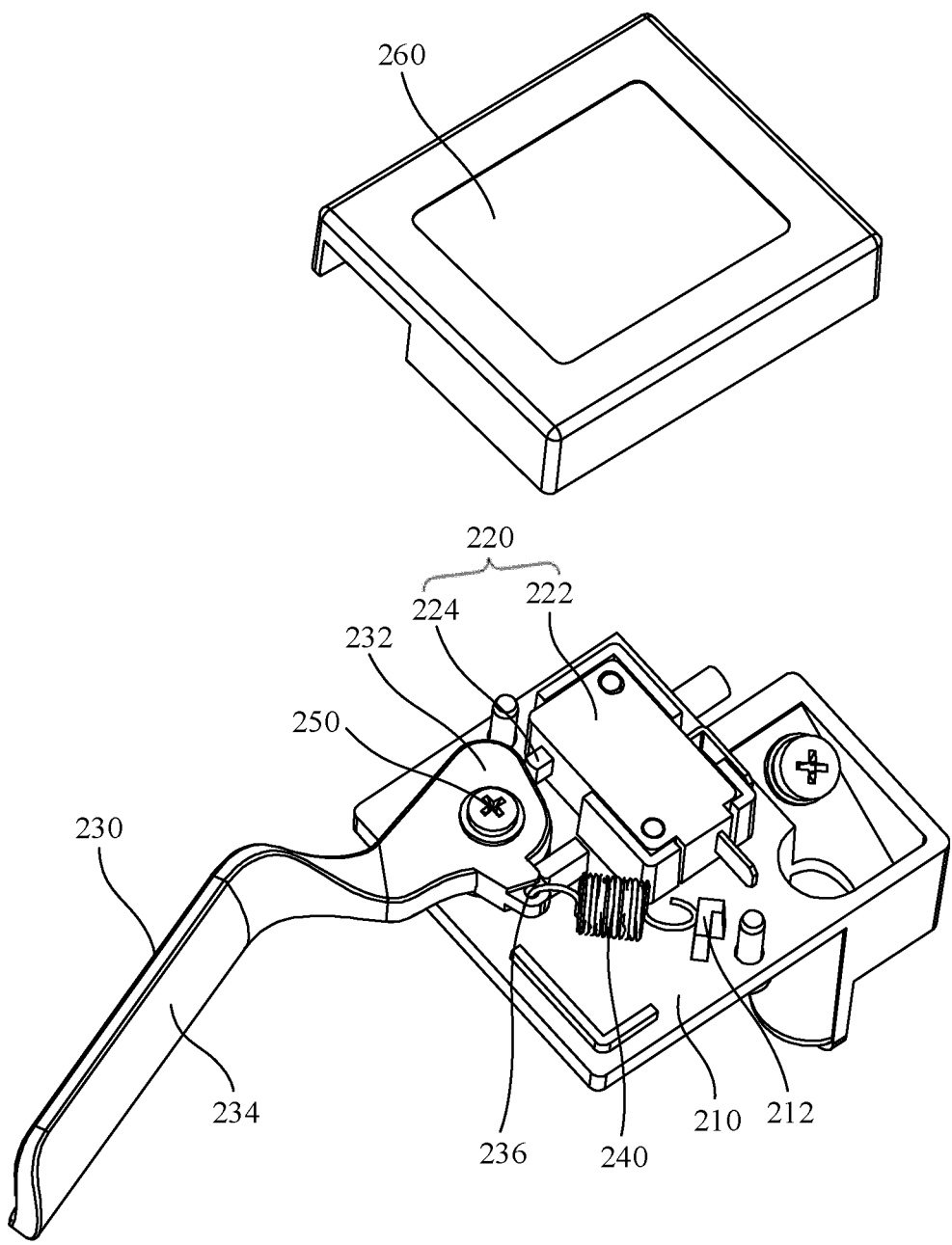
FIG. 4 is a structural schematic diagram of a brake handle device in an electric tractor shown in FIG. 1.

As shown in FIG. 3 and FIG. 4, the brake handle device 200 is mounted on the electric tractor body 100. The brake handle device 200 includes a seat body 210, a microswitch 220, a wrench 230 and an elastic piece 240. The seat body 210 is arranged at the position of the handlebar 141 of the frame 140. The microswitch 220 is electrically connected with the driving motor 110 and the power supply 130, and includes a main body part 222 and a braking part 224. The main body part 222 is arranged on the seat body 210; and the braking part 224 extends into the main body part 222 and can elastically expand and contract relative to the main body part 222. The wrench 230 is rotatably arranged on the seat body 210 and can be abutted against the braking part 224. The elastic piece 240 is arranged on the seat body 210, is connected with the wrench 230, and is used for providing an elastic force for the wrench 230 to drive the wrench 230 to rotate and reset in the direction far from the handlebar 141.

The wrench 230 is held to drive the wrench 230 to rotate in the direction close to the handlebar 141, so that the wrench 230 presses the braking part 224 into the main body part 222 for a preset length, thereby controlling the microswitch 220 to conduct the electric connection between the power supply 130 and the driving motor 110. The wrench 230 is released to make the wrench 230 rotate and reset in the direction far from the handlebar 141 under the driving of the elastic force of the elastic piece 240 and to separate the wrench 230 from the braking part 224, so that the braking part 224 is elastically reset relative to the main body part 222, thereby further controlling the microswitch 220 to disconnect the electric connection between the power supply 130 and the driving motor 110.

The brake handle device 200 provided by the present invention is mounted on the electric tractor body 100. When the electric tractor body 100 is required to work, the wrench 230 is held to drive the wrench 230 to rotate in the direction close to the handlebar 141, so that the wrench 230 presses the braking part 224 into the main body part 222 for a preset length, and then the microswitch 220 is controlled to conduct the electric connection between the power supply 130 and the driving motor 110, thereby implementing that the power supply 130 supplies power to the driving motor 110. When the electric tractor body 100 is required to stop working, only the wrench 230 needs to be released to make the wrench 230 rotate and reset in the direction far from the handlebar 141 under the driving of the elastic force of the elastic piece 240 and to separate the wrench 230 from the braking part 224, so that the braking part 224 is elastically reset relative to the main body part 222, and then the microswitch 220 is controlled to disconnect the electric connection between the power supply 130 and the driving motor 110, thereby implementing that the power supply 130 stops supplying power to the driving motor 110. Therefore, the user can control the microswitch 220 to conduct or disconnect the electric connection between the power supply 130 and the driving motor 110 without directly touching the microswitch 220 by holding or releasing the wrench 230 of the brake handle device 200 provided by the present invention, thereby greatly improving the use safety of the electric tractor body 100 and having the advantages of convenient operation and high safety.

As shown in FIG. 4, in one embodiment, the wrench 230 includes a cam 232 and a holding part 234. The cam 232 is rotatably arranged on the seat body 210, is connected with the elastic piece 240, and is used for abutting against the braking part 224. The holding part 234 is connected with the cam 232, and is used for a user to apply a holding force to the wrench 230. Further, the wrench 230 further includes a lug 236 for connecting the elastic piece 240. The lug 236 is connected with the cam 232; and one end of the elastic piece 240 is sleeved on the lug 236. Specifically, the cam 232, the holding part 234 and the lug 236 are integrally formed.

In one embodiment, the elastic piece 240 can be, but is not limited to, a tension spring; one end of the elastic piece 240 is arranged on the seat body 210; and the other end of the elastic piece 240 is arranged on the wrench 230. Specifically, a suspension lug 212 is arranged on the seat body 210; and one end of the elastic piece 240 far from the wrench 230 is sleeved on the suspension lug 212.

In one embodiment, the brake handle device 200 further includes a rotating shaft 250; and the wrench 230 is rotatably connected with the seat body 210 by the rotating shaft 250. Specifically, the rotating shaft 250 penetrates through the wrench 230 and the seat body 210; and the wrench 230 can rotate axially about the rotating shaft 250 relative to the seat body 210. In the present embodiment, the rotating shaft 250 penetrates through the cam 232 and the seat body 210; and the cam 232 is rotatably connected with the seat body 210 by the rotating shaft 250.

In one embodiment, the brake handle device 200 further includes an outer cover 260; and the outer cover 260 covers the seat body 210 and surrounds the seat body 210 to form a closed mounting space. The microswitch 220 and the elastic piece 240 are accommodated in the mounting space; and the wrench 230 is partially accommodated in the mounting space. The outer cover 260 can protect the structural elements such as the microswitch 220 and the elastic piece 240 arranged on the seat body 210, and avoids that the structural elements are damaged due to direct exposure to the external environment for a long time.

As shown in FIG. 1 and FIG. 2, in one embodiment, the wheel assembly 120 includes a first driving wheel 121 and a second driving wheel 122. Specifically, the first driving wheel 121 and the second driving wheel 122 are respectively arranged on both sides of the driving motor 110 through a first connecting shaft 123 and a second connecting shaft 124; the driving motor 110 can drive the first driving wheel 121 to rotate axially about the first connecting shaft 123 through the first connecting shaft 123 and can also drive the second driving wheel 122 to rotate axially about the second connecting shaft 124 through the second connecting shaft 124. In the present embodiment, a chassis 143 of the frame 140 is connected to the first connecting shaft 123 and the second connecting shaft 124.

As shown in FIG. 2, in one embodiment, the frame 140 further includes a support rod assembly 142 connected to the handlebar 141; and the support rod assembly 142 can be opened or folded so that the length of the support rod assembly 142 can be adjusted. Compared with the traditional non-foldable support rod assembly, the foldable support rod assembly 142 can be directly opened when it is needed and can be folded when it is not needed, thereby facilitating the user to flexibly adjust the length of the support rod assembly 142, so that the support rod assembly 142 has a more compact structure when it is not needed, which is convenient for the packaging of the whole electric tractor 10.

In one embodiment, the support rod assembly 142 includes a plurality of support rods 1422 connected in sequence; each support rod 1422 is sequentially arranged along an axial direction of the support rods 1422 when the support rod assembly 142 is in an opened state; and at least two adjacent support rods 1422 are arranged side by side along the axial direction perpendicular to the support rods 1422 when the support rod assembly 142 is in a folded state.

In one embodiment, the support rod 1422 can rotate relative to another support rod 1422 adjacent to the support rod 1422 to open or fold the support rod assembly 142. In one embodiment, the support rod assembly 142 further includes a hinge 1424; and two adjacent support rods 1422 are rotatably connected by the hinge 1424. Further, the support rod assembly 142 further includes a locking piece 1426; the locking piece 1426 is used for penetrating through the butted ends of two adjacent support rods 1422 when the support rod assembly 142 is in the opened state, so that the two adjacent support rods 1422 are fixedly connected, thereby ensuring that each support rod 1422 is sequentially arranged along the axial direction of the support rods 1422 when the support rod assembly 142 is in the opened state.

As shown in FIG. 2, in one embodiment, the frame 140 further includes the chassis 143; and the chassis 143 is connected to the wheel assembly 120 and is connected with one end of the support rod assembly 142 far from the handlebar 141. In one embodiment, the frame 140 further includes a connecting seat 144 for connecting an external vehicle, and the connecting seat 144 is arranged on the chassis 143. Specifically, after the connecting seat 144 is connected with the external vehicle, the user can drive the wheel assembly 120 to rotate by the driving motor 110 and also control the moving direction of the wheel assembly 120 by the handlebar 141 of the frame 140, so that the electric tractor 10 can drive the external vehicle to move.

Figure 5:
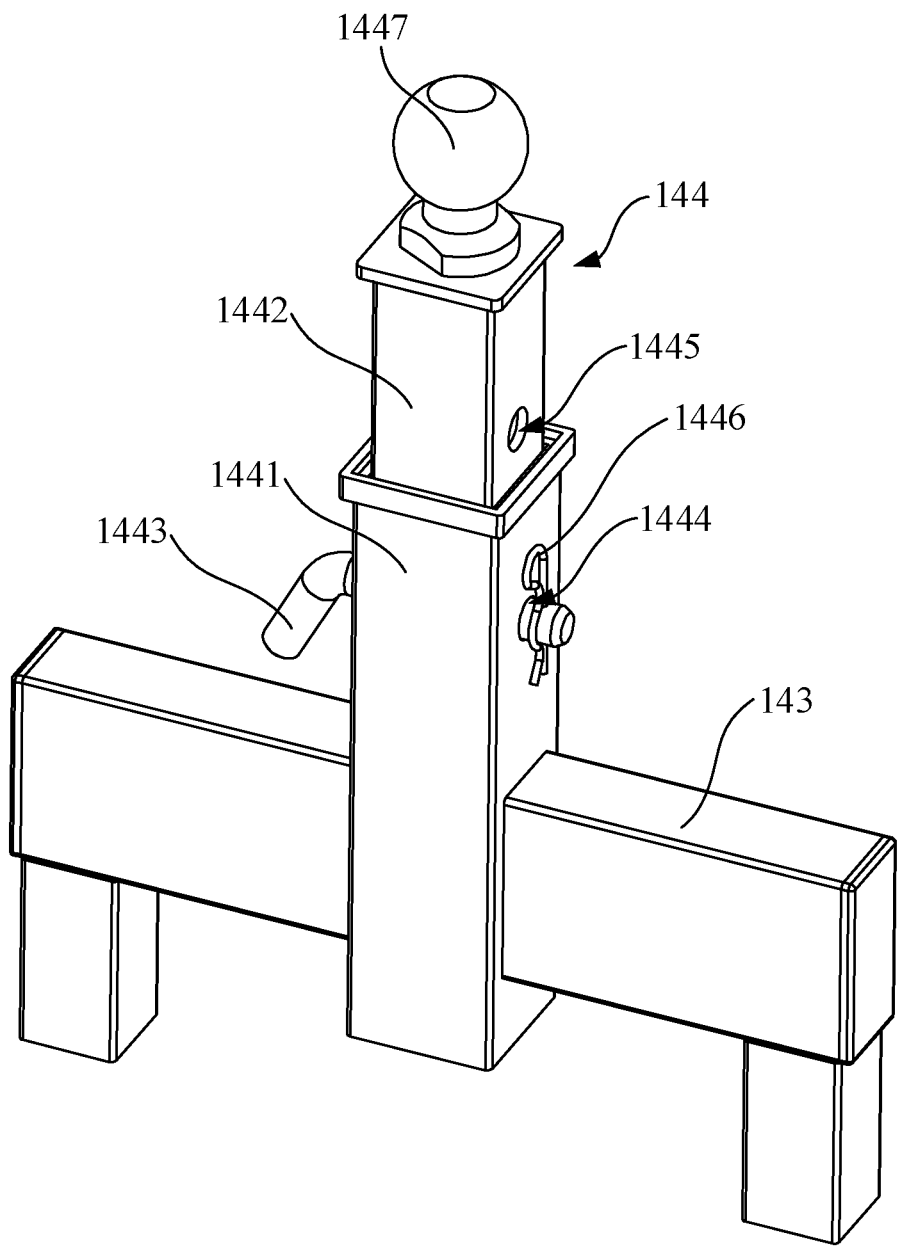
FIG. 5 is a structural schematic diagram of a part of a frame of an electric tractor shown in FIG. 1.

As shown in FIG. 5, in one embodiment, the connecting seat 144 includes a fixed pipe sleeve 1441 and a connecting arm 1442; the fixed pipe sleeve 1441 is arranged on the chassis 143; and the connecting arm 1442 is used for connecting the external vehicle, partially extends into the fixed pipe sleeve 1441, and can extend and retract relative to the fixed pipe sleeve 1441 along the axial direction of the fixed pipe sleeve 1441. Since the connecting arm 1442 can extend and retract relative to the fixed pipe sleeve 1441 along the axial direction of the fixed pipe sleeve 1441, the electric tractor 10 can be connected with the external vehicles with different heights, so that the electric tractor 10 can be adapted to the traction driving requirements of the external vehicles with different heights.

In one embodiment, the connecting seat 144 further includes locating pins 1443. A plurality of first connecting holes 1444 arranged at intervals along the axial direction of the fixed pipe sleeve 1441 are formed in an outer side wall of the fixed pipe sleeve 1441; and a plurality of second connecting holes 1445 arranged at intervals along the axial direction of the fixed pipe sleeve 1441 are formed in the outer side wall of the connecting arm 1442. The locating pins 1443 can be matched with the first connecting holes 1444 arranged at different positions on the outer side wall of the fixed pipe sleeve 1441 and the second connecting holes 1445 arranged at different positions on the outer side wall of the connecting arm 1442 to adjust and lock the telescopic length of the connecting arm 1442 relative to the fixed pipe sleeve 1441 along the axial direction of the fixed pipe sleeve 1441.

In one embodiment, the connecting seat 144 further includes a snap ring 1446; and the snap ring 1446 is used for cooperating with the locating pins 1443 when the locating pins 1443 lock the telescopic length of the connecting arm 1442 relative to the fixed pipe sleeve 1441 along the axial direction of the fixed pipe sleeve 1441, so as to abut against an outer wall of the fixed pipe sleeve 1441, thereby restricting the locating pins 1443 from coming off relative to the fixed pipe sleeve 1441 and the connecting arm 1442.

In the present embodiment, a ball joint part 1447 is arranged at one end of the connecting arm 1442; and the connecting arm 1442 is used for connecting with the external vehicle through the ball joint part 1447.

As shown in FIG. 1, in one embodiment, the electric tractor body 100 further includes a power box 150, and the power box 150 is arranged on the chassis 143. Specifically, the power supply 130 is accommodated in the power box 150. In one embodiment, a charging interface 152 is formed in a side wall of the power box 150, and the charging interface 152 is electrically connected with the power supply 130 and is used for charging the power supply 130.

As shown in FIG. 1 and FIG. 2, in one embodiment, the electric tractor body 100 further includes a load-bearing wheel 160, and the load-bearing wheel 160 is arranged at the bottom of the frame 140 and can rotate about the own axial direction. In the present embodiment, the load-bearing wheel 160 is arranged at the bottom of the chassis 143 through an auxiliary frame 170.

As shown in FIG. 2, in one embodiment, the electric tractor body 100 further includes a wire 180, and one end of the wire 180 is connected with the driving motor 110; and the other end of the wire 180 is connected with the microswitch 220, so that the driving motor 110 is electrically connected with the microswitch 220.

In one embodiment, the electric tractor body 100 further includes a pedal lever 190, and the pedal lever 190 is arranged at one end of the chassis 143 far from the wheel assembly 120 and is used for the user to step and apply force, thereby facilitating the user to mount and fix the connecting seat 144 on the external vehicle.

As shown in FIG. 2, in one embodiment, the electric tractor 10 further includes a protective piece 300, which is arranged outside the handlebar 141. When the user performs related operations of the electric tractor 10 through the handlebar 141, the protective piece 300 can disperse a collision force applied by the handlebar 141 when the handlebar 141 touches a user body, thereby reducing the harm of the handlebar 141 to the user. Meanwhile, the protective piece 300 can also ensure that the relevant switch elements around the handlebar 141 are bounced off smoothly when the user releases the handlebar 141, thereby ensuring that the relevant switch elements around the handlebar 141 of the electric tractor 10 are disconnected smoothly.

The above only describes preferred embodiments of the present invention, and shall not limit the patent scope of the present invention. Any equivalent structural transformation made by using the contents of the description and the accompany drawings of the present invention under the inventive concept of the present invention, or direct/indirect application in other related technical fields shall be included in the patent protection scope of the present invention.

What is claimed is:

1. A brake handle device, mounted on an electric tractor body, wherein the electric tractor body comprises a driving motor, a wheel assembly, a power supply and a frame; the wheel assembly is connected with the driving motor; the driving motor is used for driving the wheel assembly to rotate; the power supply is electrically connectable with the driving motor, and is used for supplying power to the driving motor; the frame is connected to the wheel assembly; and the frame is provided with a handlebar, wherein the brake handle device comprises:
   a seat body, which is arranged at the position of the handlebar of the frame;
   a microswitch, which is electrically connected with the driving motor and the power supply and comprises a main body part and a braking part, wherein the main body part is arranged on the seat body; the braking part extends into the main body part and can elastically expand and contract relative to the main body part;
   a wrench, which is rotatably arranged on the seat body and can be abutted against the braking part;
   an elastic piece, which is a tension spring arranged on the seat body, is connected with the wrench, and is used for providing an elastic force for the wrench to drive the wrench to rotate and reset in the direction far from the handlebar, wherein the wrench is held to drive the wrench to rotate in the direction close to the handlebar, so that the wrench presses the braking part into the main body part for a preset length, thereby controlling the microswitch to conduct the electric connection between the power supply and the driving motor; and the wrench is released to make the wrench rotate and reset in the direction far from the handlebar under the driving of the elastic force of the elastic piece and to separate the wrench from the braking part, so that the braking part is elastically reset relative to the main body part, thereby further controlling the microswitch to disconnect the electric connection between the power supply and the driving motor; and
   a rotating shaft, wherein the wrench is rotatably connected with the seat body by the rotating shaft;
   wherein the wrench comprises:
   a cam, which is rotatably arranged on the seat body, is connected with the elastic piece through a lug, and is abutted against the braking part; and
   a holding part, which is connected with the cam and is configured for a user to apply a holding force to the wrench;
   a first end of the elastic piece is sleeved on the lug, and a second end of the elastic piece is sleeved on a suspension lug arranged on the seat body;
   wherein the holding part is configured to extend out of the seat body; and from an "off" position of the microswitch to a fully-on position of the microswitch, a rotation angle of the holding part is less than 90°.

2. The brake handle device according to claim 1, further comprising an outer cover, which is arranged on the seat body and surrounds the seat body to form a closed mounting space, wherein the microswitch and the elastic piece are accommodated in the mounting space; and the wrench is partially accommodated in the mounting space.

3. An electric tractor, comprising:
an electric tractor body, wherein the electric tractor body comprises a driving motor, a wheel assembly, a power supply and a frame; the wheel assembly is connected with the driving motor; the driving motor is used for driving the wheel assembly to rotate; the power supply is electrically connectable with the driving motor, and is used for supplying power to the driving motor; the frame is connected to the wheel assembly; and the frame is provided with a handlebar; and
a brake handle device, wherein the brake handle device comprises:
a seat body, which is arranged at the position of the handlebar of the frame;
a microswitch, which is electrically connected with the driving motor and the power supply and comprises a main body part and a braking part, wherein the main body part is arranged on the seat body; the braking part extends into the main body part and can elastically expand and contract relative to the main body part;
a wrench, which is rotatably arranged on the seat body and can be abutted against the braking part; and
an elastic piece, which is a tension spring arranged on the seat body, is connected with the wrench, and is used for providing an elastic force for the wrench to drive the wrench to rotate and reset in the direction far from the handlebar, wherein the wrench is held to drive the wrench to rotate in the direction close to the handlebar, so that the wrench presses the braking part into the main body part for a preset length, thereby controlling the microswitch to conduct the electric connection between the power supply and the driving motor; and the wrench is released to make the wrench rotate and reset in the direction far from the handlebar under the driving of the elastic force of the elastic piece and to separate the wrench from the braking part, so that the braking part is elastically reset relative to the main body part, thereby further controlling the microswitch to disconnect the electric connection between the power supply and the driving motor; and
a rotating shaft, wherein the wrench is rotatably connected with the seat body by the rotating shaft;
wherein the wrench comprises:
a cam, which is rotatably arranged on the seat body, is connected with the elastic piece through a lug, and is abutted against the braking part; and
a holding part, which is connected with the cam and is configured for a user to apply a holding force to the wrench;
a first end of the elastic piece is sleeved on the lug, and a second end of the elastic piece is sleeved on a suspension lug arranged on the seat body;
wherein the holding part is configured to extend out of the seat body; and from an "off" position of the microswitch to a fully-on position of the microswitch, a rotation angle of the holding part is less than 90°.

4. The electric tractor according to claim 3, further comprising a protective piece which is arranged at a side of the handlebar adapted to be adjacent to a user's body during operation; and the protective piece comprises a flat sheet portion configured to disperse a collision force applied by the handlebar when the handlebar touches the user's body.

5. The electric tractor according to claim 3, wherein the frame further comprises a support rod assembly connected with the handlebar; and the support rod assembly can be opened or folded so that the length of the support rod assembly can be adjusted.

6. The electric tractor according to claim 5, wherein the support rod assembly comprises a plurality of support rods connected in sequence; each support rod is sequentially arranged along an axial direction of the support rods when the support rod assembly is in an opened state; and at least two adjacent support rods are arranged side by side along the axial direction perpendicular to the support rods when the support rod assembly is in a folded state.

7. The electric tractor according to claim 6, wherein the support rod can rotate relative to another support rod adjacent to the support rod to open or fold the support rod assembly.

8. The electric tractor according to claim 5, wherein the frame further comprises a chassis connected to the wheel assembly and an end of the support rod assembly away from the handlebar, and a connecting seat arranged on the chassis; and the connecting seat is configured for connection with an external vehicle.

9. The electric tractor according to claim 8, wherein the connecting seat comprises a fixed pipe sleeve arranged on the chassis, and a connecting arm; the connecting arm partially extends into the fixed pipe sleeve, and is configured for connection with the external vehicle; and the connecting arm is capable of extending and retracting relative to the fixed pipe sleeve along an axial direction of the fixed pipe sleeve.

10. The electric tractor according to claim 9, wherein the connecting seat further comprises a locating pin; a plurality of first connecting holes are arranged spaced apart at an outer side wall of the fixed pipe sleeve along the axial direction of the fixed pipe sleeve; a plurality of second connecting holes are arranged spaced apart at an outer side wall of the connecting arm along the axial direction of the fixed pipe sleeve; and the locating pin is configured to fit the plurality of first connecting holes and the plurality of second connecting holes to adjust and lock a length of the connecting arm extending out of the fixed pipe sleeve along the axial direction of the fixed pipe sleeve.

11. The electric tractor according to claim 10, wherein the connecting seat further comprises a snap ring; the snap ring is configured to abut against the outer side wall of the fixed pipe sleeve when the length of the connecting arm extending out of the fixed pipe sleeve is locked, thereby preventing the locating pin from falling off relative to the fixed pipe sleeve and the connecting arm.

\* \* \* \* \*